(12) United States Patent
Chen

(10) Patent No.: US 12,511,857 B2
(45) Date of Patent: Dec. 30, 2025

(54) FINGERPRINT ASSEMBLY

(71) Applicant: AAC Optics (Nanning) Co., Ltd., Guangxi (CN)

(72) Inventor: Hongbin Chen, Nanning (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 0 days.

(21) Appl. No.: 19/006,135

(22) Filed: Dec. 30, 2024

(65) Prior Publication Data
US 2025/0384645 A1    Dec. 18, 2025

Related U.S. Application Data

(63) Continuation of application No. PCT/CN2024/098843, filed on Jun. 13, 2024.

(51) Int. Cl.
*G06V 10/141*      (2022.01)
*G06V 40/13*      (2022.01)

(52) U.S. Cl.
CPC ........ *G06V 10/141* (2022.01); *G06V 40/1318* (2022.01)

(58) Field of Classification Search
CPC ............. G06V 10/141; G06V 40/1318; G06V 40/1341; G02B 6/0028; G02B 6/0018; G02B 6/005; G02B 6/0076; G02B 6/0078; G02B 6/009; G06F 3/0416
See application file for complete search history.

(56) References Cited

U.S. PATENT DOCUMENTS

| | | | | |
|---|---|---|---|---|
| 8,917,962 | B1 * | 12/2014 | Nichol | G02B 6/0028 |
| | | | | 362/311.03 |
| 2016/0328595 | A1 * | 11/2016 | Sun | G06V 40/1329 |
| 2019/0034020 | A1 * | 1/2019 | He | G06V 10/17 |
| 2021/0278585 | A1 * | 9/2021 | Nichol | G02B 6/0028 |

FOREIGN PATENT DOCUMENTS

WO    WO-2018113100 A1 *   6/2018     G06F 18/00

* cited by examiner

*Primary Examiner* — Abhishek Sarma
(74) *Attorney, Agent, or Firm* — Wiersch Law Group

(57) ABSTRACT

A fingerprint assembly including: a first circuit board, a second circuit board connected to a side of the first circuit board, a chip connected to a side of the second circuit board away from the first circuit board, a light guide aperture connected between an outer periphery of the chip and the first circuit board, and an annular-shaped light emitting element connected to the first circuit board. The first and second circuit boards and the light guide aperture jointly enclose to define an annular groove matching with the light emitting element, which is arranged in the annular groove. A light entrance surface is formed at a side of the light guide aperture facing the light emitting element and a light exit surface is formed at a side of the light guide aperture away from the first circuit board. The fingerprint assembly solves a problem of uneven light emission.

9 Claims, 3 Drawing Sheets

FINGERPRINT ASSEMBLY

TECHNICAL FIELD

The present disclosure belongs to the technical field of fingerprint identification, and in particular, to a fingerprint assembly.

BACKGROUND

In fingerprint identification technology, a fingerprint pattern on a finger can be collected by a fingerprint sensor, and then the fingerprint pattern can be compared with fingerprint information stored in a system to determine whether the fingerprint pattern is correct or not, thereby realizing identity identification. Therefore, fingerprint identification has the characteristics of convenience in use and high security, and can be used in scenarios such as device unlocking, wake-up, and payment.

In the related art, in order to meet diverse usage requirements of users, some fingerprint assemblies may be further provided with a light emitting element and a light guide component for refracting light emitted by the light emitting element to the outside. A certain space needs to be formed between the light emitting element and the light guide component, so that the emitted light can reach each part of a receiving surface of the light guide component, as a result, the fingerprint assembly may have a relatively large size, and problems such as uneven brightness in different parts of a light guide aperture may be caused.

SUMMARY

An object of the present disclosure is to provide a fingerprint assembly, which can at least solve the problem in the related art that it is difficult for a light emitting fingerprint assembly to have a small size and uniform brightness.

In an aspect, an embodiment of the present disclosure provides a fingerprint assembly, including: a first circuit board; a second circuit board connected to a side of the first circuit board; a chip connected to a side of the second circuit board facing away from the first circuit board; a light guide aperture connected between an outer peripheral side of the chip and the first circuit board; and a light emitting element formed as annular shape and connected to the first circuit board. The first circuit board, the second circuit board, and the light guide aperture jointly enclose to define an annular groove matching with the light emitting element, and the light emitting element is arranged in the annular groove; and a light entrance surface is formed at a side of the light guide aperture facing the light emitting element, and a light exit surface is formed at a side of the light guide aperture away from the first circuit board.

As an improvement, the second circuit board is spaced from the light emitting element; a side of the light emitting element facing the second circuit board is provided with a light output surface, a reflection portion opposite to the light output surface is formed at the second circuit board, an area of the light output surface is smaller than an area of the reflection portion, and the area of the reflection portion is smaller than an area of the light entrance surface.

As an improvement, a solder resist ink layer is connected to an outer periphery of the second circuit board, and at least part of the solder resist ink layer is the reflection portion.

As an improvement, the solder resist ink layer is one of following colors: white, yellow, red, green, and blue.

As an improvement, the light guide aperture is formed by light-transmitting plastic or glass.

As an improvement, a diffuser sheet is attached to the light entrance surface.

As an improvement, the light guide aperture includes a first light guide portion connected to the first circuit board, and a second light guide portion bent and connected to the first light guide portion; an end of the second light guide portion away from the first light guide portion is connected to the chip; and the first light guide portion and the second light guide portion each include the light entrance surface.

As an improvement, a decoration member is further connected to an outer peripheral side of the light guide aperture; the decoration member includes a main portion connected to an outer side of the light guide aperture, a first connection portion connected to a top end of the main portion and extending in a first direction, and a second connection portion connected to a bottom end of the main portion and extending in a direction opposite to the first direction; and the first connection portion abuts against a top of the light guide aperture, and the second connection portion is fixed to the first circuit board.

As an improvement, the first circuit board is one of a flexible board, a rigid board, or a rigid-flex board.

As an improvement, the second circuit board is a rigid board.

The present disclosure has the following beneficial effects: the light emitting element is formed as an annular shape, and the light emitting element surrounds the outer periphery of the second circuit board and the inner side of the light guide aperture, so that light emitted by the light emitting element 4 can evenly reach each part of the light guide aperture 5, thereby realizing uniform light emission of the fingerprint assembly. Moreover, the fingerprint assembly according to the embodiments of the present disclosure has a simple structure and an ingenious design, so that a volume of the fingerprint assembly can be made smaller.

DESCRIPTION OF EMBODIMENTS

Figure 1:
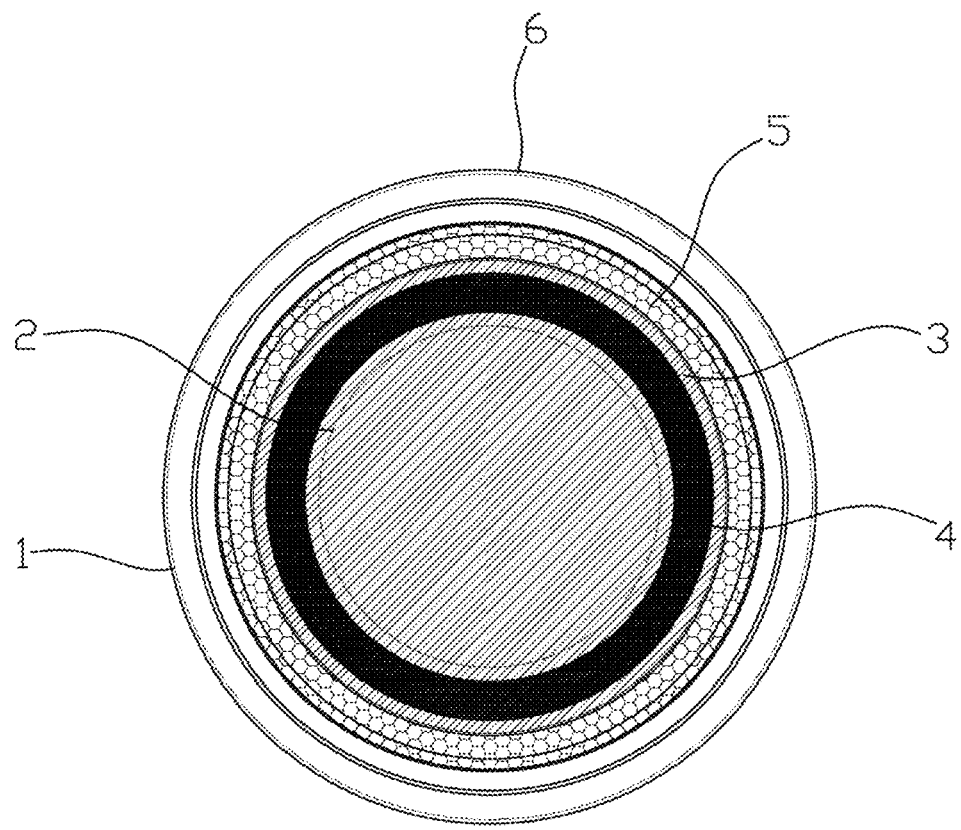
FIG. 1 is an overall structural view of a fingerprint assembly in a top view according to an embodiment of the present disclosure.

Embodiments of the present disclosure will be described in detail below, examples of which are shown in the drawings. Same or similar reference numerals indicate same or similar elements or elements with same or similar functions. The embodiments described below with reference to the drawings are exemplary, and are intended to explain the present disclosure rather than limiting the present disclosure. All other embodiments acquired by those skilled in the art without creative efforts based on the embodiments of the present disclosure shall fall within a scope of the present disclosure.

In the description of the embodiments of the present application, the technical terms "center", "longitudinal", "lateral", "length", "width", "thickness", "upper", "lower", "front", "back", "left", "right", "vertical", "horizontal", "top", "bottom", "inner", "outer", "clockwise", "counter-clockwise", "axial", "radial", "circumferential", etc. indicate the orientation or position relationship based on the orientation or position relationship shown in the drawings, which is only for the convenience of describing the embodiments of the present application and simplifying the description, and does not indicate or imply that the device or element referred to must have a specific orientation, be constructed and operated in a specific orientation, and therefore cannot be understood as a limitation on the embodiments of the present application.

In addition, in the description of the embodiments of the present disclosure, the technical terms "first", "second", etc. are merely used to distinguish different objects, and cannot be illustrated as indicating or implying relative importance or implicitly indicating the number, specific order or primary and secondary relationship of the indicated technical features. In the description of the embodiments of the present disclosure, the term "multiple/a plurality of" refers to more than two, unless otherwise clearly and specifically defined.

EMBODIMENTS

Figure 2:
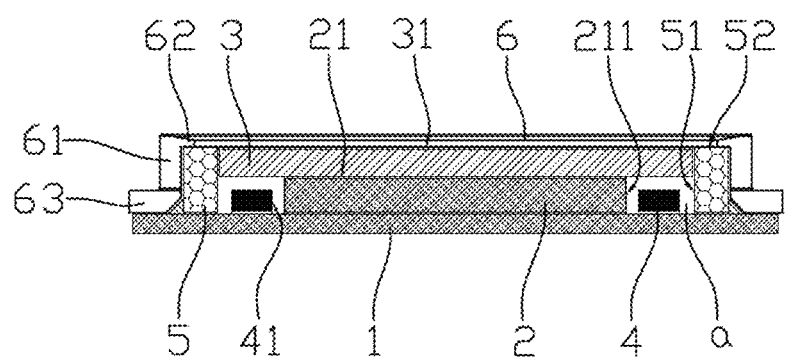
FIG. 2 is a sectional view of a fingerprint assembly according to an embodiment of the present disclosure.
Figure 3:
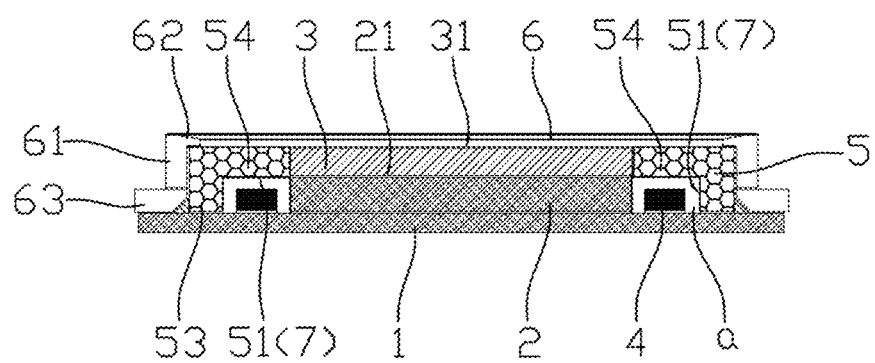
FIG. 3 is a sectional view of a fingerprint assembly according to another embodiment of the present disclosure.

As shown in FIG. 1 to FIG. 3, in an embodiment of the present disclosure, a fingerprint assembly includes a first circuit board 1, a second circuit board 2 connected to a side of the first circuit board 1, a chip 3 connected to a side of the second circuit board 2 facing away from the first circuit board 1, a light guide aperture 5 connected between an outer peripheral side of the chip 3 and the first circuit board 1, and a light emitting element 4 formed as annular shape and connected to the first circuit board 1. The first circuit board 1, the second circuit board 2, and the light guide aperture 5 jointly enclose to define an annular groove a that matches the light emitting element 4, and the light emitting element 4 is arranged in the annular groove a. A light entrance surface 51 is formed at a side of the light guide aperture 5 facing the light emitting element 4, and a light exit surface 52 is formed at a side of the light guide aperture 5 away from the first circuit board 1.

For example, the light emitting element 4 in an embodiment of the present disclosure may be an LED lamp. The LED lamp is small in size, light in weight, and does not take up excessive space inside the fingerprint assembly, making it easy to install. Meanwhile, it is beneficial to realizing light weight of the fingerprint assembly, and the LED lamp can further emit light of different colors to meet diverse display requirements and aesthetic requirements of users. The light emitting element 4 may be formed as an annular shape and fixed in the annular groove a defined by the first circuit board 1, the second circuit board 2, and the light guide aperture 5. That is, the light emitting element 4 surrounds an outer periphery of the second circuit board 2 and an inner side of the light guide aperture 5, so that light emitted by the light emitting element 4 can evenly reach each part of the light guide aperture 5, thereby realizing uniform light emission of the fingerprint assembly. Moreover, the fingerprint assembly in the embodiments of the present disclosure has a simple structure and an ingenious design, so that a volume of the fingerprint assembly can be made smaller.

As shown in FIG. 2, in an embodiment of the present disclosure, the first circuit board 1, the second circuit board 2, the chip 3, and the light guide aperture 5 jointly enclose to define the annular groove a, and the second circuit board 2 is spaced from the light emitting element 4 in the annular groove a. A side of the light emitting element 4 facing the second circuit board 2 is provided with a light output surface 41, and a reflection portion 211 opposite to the light output surface 41 is formed at the second circuit board 2. Areas of the light output surface 41, the reflection portion 211, and the light entrance surface 51 are sequentially increased.

In an example, the light emitting element 4 according to an embodiment of the present disclosure may be a side-emitting LED lamp, and the light output surface 41 is arranged at a side of the light emitting element 4 adjacent to the second circuit board 2, so that light emitted by the light emitting element 4 may first reach the reflection portion 211 of the second circuit board 2 and then be reflected to the light entrance surface 51 of the light guide aperture 5. That is, without increasing the space between the light emitting element 4 and the light guide aperture 5, a path of the light propagating between the light emitting element 4 and the light guide aperture 5 becomes longer, thereby achieving a light scattering effect.

It can be understood that, in an embodiment of the present disclosure, a projection area of the chip 3 may be greater than a projection area of the second circuit board 2, and a top of the light emitting element 4 is opposite to an edge of a bottom side of the chip 3. Therefore, in in some embodiments of the present disclosure, an edge of a bottom side of the chip 3 may also be configured as the reflection portion 211. That is, a part of the light may first reflect the light reaching the second circuit board 2 to the chip 3, and then reflect the light from the chip 3 to the light entrance surface 51 of the light guide aperture 5. Such a configuration further increases the path for the light to propagate between the light emitting element 4 and the light guide aperture 5, thereby improving the light scattering effect, and making the brightness of the light output from each part of the light exit surface 52 more uniform. It is understandable that, in some other embodiments of the present disclosure, the light output surface 41 may be arranged at the top of the light emitting element 4, so that an optical fiber can reach the reflection portion 211 at the bottom of the chip 3, then be reflected to the light entrance surface 51, and then be emitted from the light exit surface 52 after multiple refractions in the light guide aperture 5. In addition, the light output surface 41 may be arranged at a side of the light emitting element 4 away from the second circuit board 2, that is, the light emitted by the light emitting element 4 may be directly emitted to the light guide aperture 5, no limitation is made here.

As shown in FIG. 3, in an embodiment of the present disclosure, a diffuser sheet 7 is attached to the light entrance surface 51. The application of the diffuser sheet 7 can improve the light diffusing effect of the light guide aperture 5, so that the light emitted from the light guide aperture 5 is more uniform and softer.

As shown in FIG. 3, in another embodiment of the present disclosure, the light guide aperture 5 includes a first light guide portion 53 connected to the first circuit board 1, and a second light guide portion 54 bent and connected to the first light guide portion 53. An end of the second light guide portion 54 away from the first light guide portion 53 is connected to the chip 3. The first light guide portion 53 and the second light guide portion 54 each are provided with a light entrance surface 51. That is, a projection area of the chip 3 may be equal to a projection area of the second circuit board 2. The first circuit board 1, the second circuit board 2, and the light guide aperture 5 directly enclose to define the annular groove a. The light emitting element 4 may be configured in a single-side light emission form, or may be configured in a multi-sides light emission form. The light emitted by the light emitting element 4 may be directly emitted to the light entrance surface 51, or emitted to the light entrance surface 51 after being reflected by the reflection portion 211 of the second circuit board 2. Then the light passes the diffuser sheet 7, and is refracted in the first light guide portion 53 and/or the second light guide portion 54, and is finally emitted out from the fingerprint assembly, thereby achieving uniform light emission of the fingerprint assembly.

In an embodiment of the present disclosure, the outer periphery of the second circuit board 2 is connected to a solder resist ink layer 21, and at least part of the solder resist ink layer 21 is the reflection portion 211. For example, the solder resist ink layer 21 may be provided at both the outer sides of the first circuit board 1 and the second circuit board 2. The presence of the solder resist ink layer 21 may protect circuits on the first circuit board 1 and the second circuit board 2, and light can be directly reflected on the solder resist ink layer 21, which has a good reflection effect. The first circuit board 1 and the second circuit board 2 can be connected by solder paste soldering, the first circuit board 1 and the light emitting element 4 can be connected by solder paste soldering, and the second circuit board 2 and the chip 3 can be connected by solder paste soldering. Further, in an embodiment of the present disclosure, the solder resist ink layer 21 may be one of the following colors: white, yellow, red, green, and blue. In an example, the solder resist ink layer 21 is white, and has good light reflection and light scattering effects, thereby improving the uniformity and reliability of light emission of the fingerprint assembly.

In an embodiment of the present disclosure, the light guide aperture 5 may be formed by light-transmitting plastic or glass, which has good light guide performance and low costs in formation and processing. The material of the plastic part may be Polycarbonate (PC). The light guide aperture 5 may be adhered to the first circuit board 1 by an adhesive, providing good connection stability.

In an embodiment of the present disclosure, a side of the chip 3 away from the second circuit board 2 is further provided with an insulating layer 31, which can protect the chip 3 and decorate the chip 3, and can allow fingerprint information of the user to pass and be sensed by the chip 3. In an embodiment of the present disclosure, the insulating layer 31 is one of a paint-cured member, a glass member and a ceramic member. That is, the insulating layer may be a sprayed paint layer or a cover plate. In an example, the insulating layer 31 is a paint-cured member, which is formed by spraying paint on the surface of the chip 3 and curing the paint. The paint-cured member not only has an insulation function, but also has waterproof and oil-proof functions. It is understandable that, the insulating layer 31 may be a glass member, and the glass member can be directly adhered to the surface of the chip 3 by an adhesive, which has a simple structure and is convenient to assemble, thereby improving the production efficiency.

In an embodiment of the present disclosure, the outer peripheral side of the light guide aperture 5 is further connected to a decoration member 6, which includes a main portion 61 connected to an outer side of the light guide aperture 5, a first connection portion 62 connected to a top end of the main portion 61 and extending in a first direction, and a second connection portion 63 connected to a bottom end of the main portion 61 and extending in a direction opposite to the first direction. The first connection portion 62 abuts against the top of the light guide aperture 5, and the second connection portion 63 is fixed to the first circuit board 1. That is, the second connection portion 63 and the first circuit board 1 may be bonded and fixed by an adhesive. The first connection portion 62 abuts against the outer edge of the top side of the light guide aperture 5. The main portion 61, the first connection portion 62 and the second connection portion 63 may be an integrally formed metal part, which may be formed by aluminum or stainless steel. The decoration member 6 formed by the metal part matches with the light guide aperture 5 and the first circuit board 1 in shape, and the arrangement of the decoration member 6 can make an appearance of the fingerprint assembly more attractive and firm.

In an embodiment of the present disclosure, the first circuit board 1 is one of a flexible board, a rigid board, or a rigid-flex board. In an example, the first circuit board 1 is a flexible board, which is conducive to improving a hand feeling when performing a fingerprint manipulation operation by the user. The second circuit board 2 may be a rigid board, so that the fingerprint assembly can have both a good hand feeling and a good quality feeling. It can be understood that, in an actual production and application process, those skilled in the art can select the material of the first circuit board 1 and/or the second circuit board 2 as a rigid board or a flexible board according to actual requirements. In addition, those skilled in the art can also configure an overall main view structure of the fingerprint assembly as a quadrilateral, a rounded quadrilateral, a circle, an ellipse or other polygonal structures commonly used in the art according to actual requirements. Those skilled in the art can also adjust size parameters of the first circuit board 1, the second circuit board 2, the chip 3 and other devices as needed, no limitation is made herein.

The above description merely illustrates some embodiments of the present disclosure. It should be noted that those skilled in the art may make improvements without departing from a creative concept of the present disclosure, and all these improvements shall fall into a protection scope of the present disclosure.

What is claimed is:

1. A fingerprint assembly, comprising:
a first circuit board;
a second circuit board connected to a side of the first circuit board;
a chip connected to a side of the second circuit board facing away from the first circuit board;
a light guide aperture connected between an outer peripheral side of the chip and the first circuit board; and
a light emitting element formed as annular shape and connected to the first circuit board,
wherein the first circuit board, the second circuit board, and the light guide aperture jointly enclose to define an annular groove matching with the light emitting element, and the light emitting element is arranged in the annular groove; and a light entrance surface is formed at a side of the light guide aperture facing the light emitting element, and a light exit surface is formed at a side of the light guide aperture away from the first circuit board,
wherein a decoration member is further connected to an outer peripheral side of the light guide aperture; the decoration member comprises a main portion connected to an outer side of the light guide aperture, a first connection portion connected to a top end of the main portion and extending in a first direction, and a second connection portion connected to a bottom end of the main portion and extending in a direction opposite to the first direction; and the first connection portion abuts against a top of the light guide aperture, and the second connection portion is fixed to the first circuit board.

2. The fingerprint assembly as described in claim 1, wherein the second circuit board is spaced from the light emitting element; a side of the light emitting element facing the second circuit board is provided with a light output surface, a reflection portion opposite to the light output surface is formed at the second circuit board, an area of the light output surface is smaller than an area of the reflection portion, and the area of the reflection portion is smaller than an area of the light entrance surface.

3. The fingerprint assembly as described in claim 2, wherein a solder resist ink layer is connected to an outer periphery of the second circuit board, and at least part of the solder resist ink layer is the reflection portion.

4. The fingerprint assembly as described in claim 3, wherein the solder resist ink layer is one of following colors: white, yellow, red, green, and blue.

5. The fingerprint assembly as described in claim 1, wherein the light guide aperture is formed by light-transmitting plastic or glass.

6. The fingerprint assembly as described in claim 1, wherein a diffuser sheet is attached to the light entrance surface.

7. The fingerprint assembly as described in claim 1, wherein the light guide aperture comprises a first light guide portion connected to the first circuit board, and a second light guide portion bent and connected to the first light guide portion; an end of the second light guide portion away from the first light guide portion is connected to the chip; and the first light guide portion and the second light guide portion each comprise the light entrance surface.

8. The fingerprint assembly as described in claim 1, wherein the first circuit board is one of a flexible board, a rigid board, or a rigid-flex board.

9. The fingerprint assembly as described in claim 1, wherein the second circuit board is a rigid board.

* * * * *